United States Patent
Xiao et al.

(10) Patent No.: US 11,301,884 B2
(45) Date of Patent: Apr. 12, 2022

(54) SEED POPULATION DIFFUSION METHOD, DEVICE, INFORMATION DELIVERY SYSTEM AND STORAGE MEDIUM

(71) Applicant: Tencent Technology (Shenzhen) Company Limited, Shenzhen (CN)

(72) Inventors: Yingpeng Xiao, Shenzhen (CN); Zhangbin Zhu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 242 days.

(21) Appl. No.: 16/410,925

(22) Filed: May 13, 2019

(65) Prior Publication Data

US 2019/0266624 A1 Aug. 29, 2019

Related U.S. Application Data

(63) Continuation of application No. PCT/CN2017/118791, filed on Dec. 27, 2017.

(30) Foreign Application Priority Data

Jan. 6, 2017 (CN) .......................... 201710009673.7

(51) Int. Cl.
*G06Q 30/02* (2012.01)
*G06N 7/00* (2006.01)
*H04L 67/55* (2022.01)

(52) U.S. Cl.
CPC .......... *G06Q 30/0204* (2013.01); *G06N 7/00* (2013.01); *G06Q 30/02* (2013.01); *G06Q 30/0251* (2013.01); *H04L 67/26* (2013.01)

(58) Field of Classification Search
None
See application file for complete search history.

(56) References Cited

U.S. PATENT DOCUMENTS

2012/0192214 A1* 7/2012 Hunn ................. H04N 21/6582
725/9
2014/0019240 A1* 1/2014 Zhou ..................... G06Q 50/01
705/14.66
(Continued)

FOREIGN PATENT DOCUMENTS

| CN | 105427129 A | 3/2016 |
| CN | 105931079 A | 9/2016 |

(Continued)

OTHER PUBLICATIONS

Oentaryo, Richard, Detecting Click Fraud in Online Advertising: A Data Mining Approach, Mar. 13, 2014, Journal of Machine Learning Research, 15, 99-140 (Year: 2014).*
(Continued)

*Primary Examiner* — Susanna M. Diaz
*Assistant Examiner* — Kristin E Gavin
(74) *Attorney, Agent, or Firm* — Morgan, Lewis & Bockius LLP

(57) ABSTRACT

Embodiments of this application provide a seed group spreading method performed at a server. The method includes the following steps: obtaining a positive sample set; obtaining a negative sample set; concatenating each positive sample in the positive sample set with a corresponding positive sample feature to form a positive sample feature vector, and concatenating each negative sample in the negative sample set with a corresponding negative sample feature to form a negative sample feature vector; obtaining a target sample feature set from the positive sample feature vector and the negative sample feature vector according to at least two of a target group index, an information gain, and a logistic regression model; and sending the target sample feature set to a decision end, receiving feedback information (Continued)

of the decision end, and determining, according to the feedback information, whether to spread the seed group.

17 Claims, 8 Drawing Sheets

(56) References Cited

U.S. PATENT DOCUMENTS

2015/0317651 A1* 11/2015 Barker ............... G06Q 30/0204
  705/7.33
2016/0379268 A1* 12/2016 Song ..................... G06N 20/00
  705/14.53

FOREIGN PATENT DOCUMENTS

| CN | 106126544 A |   | 11/2016 |
| CN | 106570718 A | * | 4/2017  |

OTHER PUBLICATIONS

Tencent Technology, WO, PCT/CN2017/118791, Mar. 19, 2018, 3 pgs.
Tencent Technology, IPRP, PCT/CN2017/118791, Jul. 9, 2019, 4 pgs.
Tencent Technology, ISR, PCT/CN2017/118791, Mar. 19, 2018, 2 pgs.

* cited by examiner

SEED POPULATION DIFFUSION METHOD, DEVICE, INFORMATION DELIVERY SYSTEM AND STORAGE MEDIUM

CROSS-REFERENCE TO RELATED APPLICATIONS

This application is a continuation application of PCT/CN2017/118791, entitled "SEED GROUP SPREADING METHOD AND APPARATUS, INFORMATION PUSH SYSTEM, AND STORAGE MEDIUM" filed on Dec. 27, 2017, which claims priority to Chinese Patent Application No. 201710009673.7, entitled "SEED GROUP SPREADING METHOD AND APPARATUS, AND INFORMATION PUSH SYSTEM" filed with China National Intellectual Property Administration on Jan. 6, 2017, all of which are incorporated by reference in their entireties.

FIELD OF THE TECHNOLOGY

This application relates to the field of Internet information processing technologies, and in particular, to a seed group spreading method and apparatus, an information push system, and a storage medium.

BACKGROUND OF THE DISCLOSURE

With the development of Internet technologies, various instant messaging and social applications have sprung up. Large amounts of user data involved in the instant messaging and social applications, such as user preferences, ages, and requirements are of great significance in information push such as advertisement push.

In this field, a group that is of persons having the same requirement on and the same interest in products and services and that is collected in a particular service scenario is referred to as a seed group. A quantity of seed groups is usually not very large, and is generally below one hundred thousand. A group of persons having the same feature as those in the seed group is referred to as an expansion group. A quantity of the expansion groups is usually several times the quantity of the seed groups. Generally, during advertisement push, an expansion group is first found by using a seed group, and the expansion group is then used as target users of the advertisement push. When there is a plurality of seed groups, expansion groups of the seed groups are first found, and an intersection set of the expansion groups of the seed groups is then used as target users of final advertisement push.

SUMMARY

An embodiment of this application provides a seed group spreading method performed at a server, the method including the following steps: obtaining, from candidate users of a database, a seed group and information corresponding to the seed group, and using the seed group as a positive sample set, the positive sample set including a plurality of positive samples, the seed group including a plurality of seed users, one seed user being corresponding to one positive sample, and the information corresponding to the seed group including a positive sample feature corresponding to each seed user; obtaining a non-seed group and information corresponding to the non-seed group, and using the non-seed group as a negative sample set, the negative sample set including a plurality of negative samples; concatenating each positive sample in the positive sample set with a corresponding positive sample feature to form a positive sample feature vector, and concatenating each negative sample in the negative sample set with a corresponding negative sample feature to form a negative sample feature vector, the non-seed group including a plurality of non-seed users, one non-seed user being corresponding to one negative sample, and the information corresponding to the non-seed group including a negative sample feature corresponding to each non-seed user; obtaining a target sample feature set from the positive sample feature vector and the negative sample feature vector according to at least two of a target group index (TGI), an information gain (IG), and a logistic regression (LR) model; sending the target sample feature set to a decision end, and receiving feedback information of the decision end; and spreading the seed group if it is determined according to the feedback information to spread the seed group.

An embodiment of this application further provides a server comprising: one or more processors, memory, and a plurality of machine readable instructions stored in the memory. The plurality of machine readable instructions, when executed by the one or more processors, cause the server to perform the foregoing seed group spreading method.

An embodiment of this application further provides a non-volatile computer readable storage medium, storing a plurality of machine readable instructions in connection with a server having one or more processors, wherein the plurality of machine readable instructions, when executed by the one or more processors, cause the server to perform the foregoing seed group spreading method.

BRIEF DESCRIPTION OF THE DRAWINGS

Specific implementations of this application are further described in detail below with reference to the accompanying drawings.

DESCRIPTION OF EMBODIMENTS

To enable a person skilled in the art better understand the solutions of this application, the technical solutions of the embodiments of this application will be described clearly and completely below with reference to the accompanying drawings of the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

To make the objective, technical solutions, and advantages of this application clearer, the implementations of this application are described below in detail with reference to the accompanying drawings.

The inventor of this application found in the research and practice processes that, because an intersection set of expansion groups of all seed groups is selected as target users of advertisement push, when a quantity of the seed groups is relatively large, a data calculation amount may be relatively large; and the seed groups may have low-quality seed users with redundancy or low credibility. This may affect determining of the target users, and cause a poor advertisement push effect.

Figure 1:
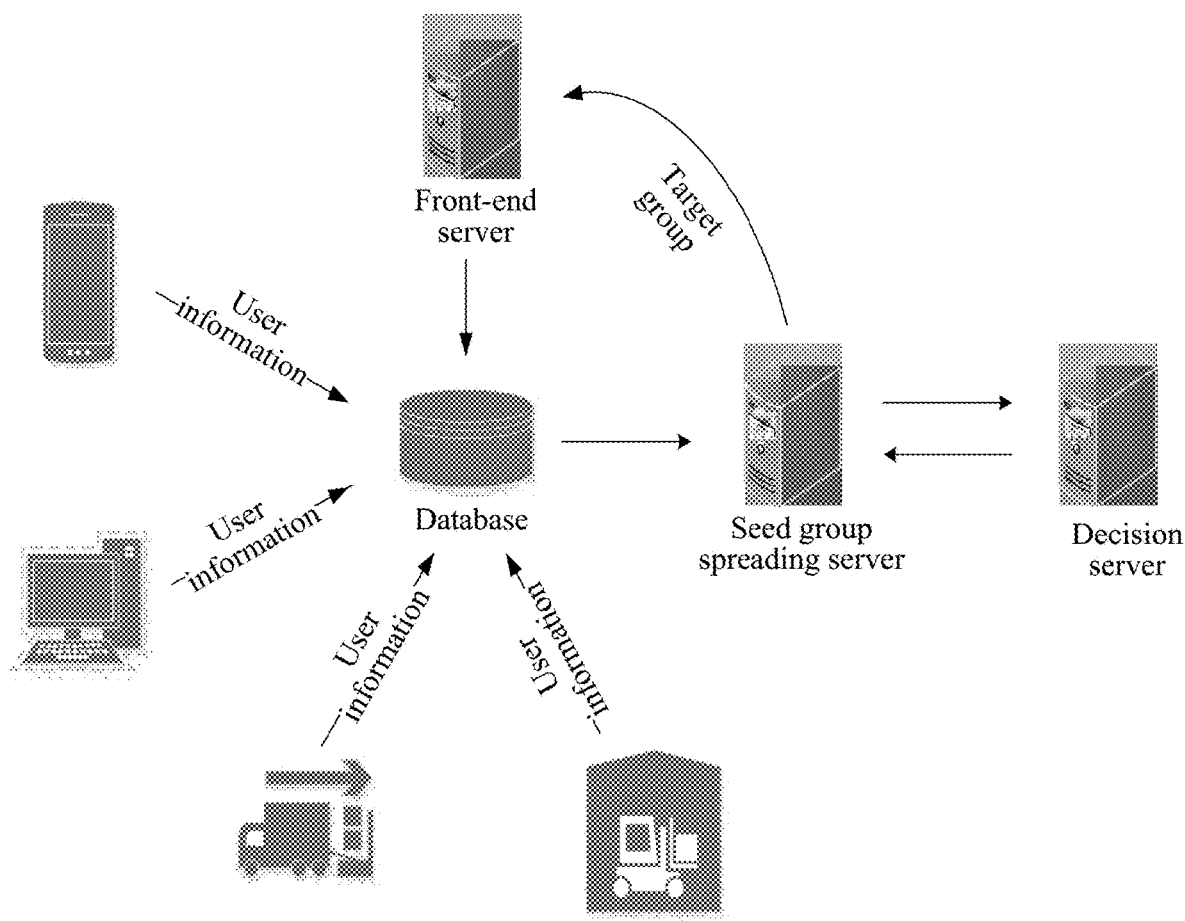
FIG. 1 is a schematic diagram of an implementation environment according to an embodiment of this application.

Based on this, an embodiment of this application provides a seed group spreading system. FIG. 1 is a schematic diagram of an application scenario of an information push system according to an embodiment of this application. The application scenario includes a database. The database is mainly used to obtain massive candidate groups collected by various collection platforms, and the groups are also referred to as market users (or referred to as candidate users). The seed group is a sample group comprising users obtained from the market users, and the seed group refers to a group of people that is made up of persons having the same/similar characteristics, e.g. the same/similar requirement on and the same/similar interest in products and services and that characteristics may be collected in a particular service scenario. The seed group is selected from the market users by system users according to a specified target condition.

A seed group spreading server is an apparatus that is in the system and that is configured to seek the market users for a group having a feature similar to the seed group according to the seed group feature.

A front-end server is configured to receive information from systems, and may be further configured to push specified information to a target group.

A decision server is configured to estimate and determine the seed group feature obtained by the seed group spreading server, and obtain a decision about whether the seed group is suitable for being spread.

Figure 2:
FIG. 2 is a schematic flowchart of a seed group spreading method according to an embodiment of this application.

FIG. 2 shows a seed group spreading method according to an embodiment of this application. The method may be applied to the implementation environment shown in FIG. 1. The method may include the following steps:

S210. Obtain information about a seed group, and use the seed group as a positive sample set, the positive sample set including a plurality of positive samples.

In this embodiment of this application, the seed group is collected in a particular service scenario, and may be obtained by using information platforms or databases, and is stored in a preset database. In an example, the seed group is a group of persons having the same requirement on and the same interest in a product or service, and a quantity of seed groups is usually not large, and is generally below one hundred thousand. The seed group may be obtained from the preset database, where data of the preset database may be uploaded by information hosts of various types of information (such as advertisements), or obtained from corresponding transaction platforms.

Because the seed group is a group of persons having the same requirement on and the same interest in products and services, this type of group is used as a positive sample set.

S220. Obtain information about a non-seed group, and use the non-seed group as a negative sample set, the negative sample set including a plurality of negative samples.

Using the seed group as the positive sample is to analyze the seed group. The seed group needs to be analyzed, and in an analyzing process, a negative sample set relative to the seed group may also need to be used.

It may be understood that, to find a user group similar to the seed group from the market users, the problem is converted into a classic binary classification (0, 1) problem, that is, an output result only has two categories such as (interested/uninterested), (like/dislike), (spam/ham), and (enemy/non-enemy).

A sample labeled in sample data used by a training model in a binary classification model is referred to as a positive sample, and a sample not labeled in the sample data used by the training model in the binary classification model is referred to as a negative sample, including a potential label sample.

For example, assuming that the seed group is users having interest in tablet computers of a brand, in this case, the seed group users are defined as a positive sample set for classification model training learning, and referred to as a first positive sample set herein. Users having no interest in the tablet computers of the brand are found from the market users, that is, the candidate seed group in the foregoing preset database, as negative samples for the model training learning. The negative samples are referred to as a first negative sample set herein. In a selection process, a quantity of samples in the first negative sample set may be the same as that in the first positive sample set, or may different from that in the first positive sample set.

In an example, after the positive sample set is obtained from the market users, the selected positive sample set is excluded from a market group, and negative sample sets with the same quantity as the positive samples are then selected.

S230. Concatenate each positive sample in the positive sample set with a corresponding positive sample feature to form a positive sample feature vector, and concatenate each negative sample in the negative sample set with a corresponding negative sample feature to form a negative sample feature vector.

The sample features are features owned by a person in the sample group, and the features reflect characteristics owned by the samples in aspects. For example, in positive samples having interest in some goods, personal features of persons are different, a first person is a female user in a region A, aged 36, a second person is a male user in a region B, aged 30, and a third person is a male user in a region C, aged 33. The three persons have at least personal features, namely, regions, ages, and genders, and these features exist in both positive samples and negative samples. Certainly, some features that are not owned by other persons also exist. For example, a fourth person is a female user in the region A, aged 30, and this user is a VIP user of a video website. Therefore, when the samples and the sample features are concatenated, the samples and the sample features exist in a vector form. For example, the first user after the concatenating may be represented as {1, A, F, 30-49, 0, . . . }, the second user after the concatenating may be represented as {2, B, M, 30-49, 0, . . . }, the third user after the concatenate may be represented as {3, C, M, 30-49, 0, . . . }, and the fourth user after the concatenating may be represented as {4, A, F, 30-49, 1, . . . }. The first bit of an array represents a sample number, the second bit of the array represents a sample region, the third bit of the array represents the gender, the fourth bit of the array represents an age group, and the fifth bit of the array is a special identification bit. For example, in this example, the fifth bit may represent that the user is a VIP user of a video website. Certainly, because of the independent characteristics of the sample persons, there are many sample attributes, and a finally obtained vector dimension for representing the sample features may reach several thousands to even tens of thousands.

S240. Obtain a target sample feature set from the positive sample feature vector and the negative sample feature vector according to at least two of a TGI, an IG, and an LR model.

After the positive samples and the negative samples are jointed with the sample features, a target feature set for reflecting characteristics of the positive samples and the negative samples needs to be obtained. In this embodiment, the target feature set is implemented based on at least two of the TGI, the IG, and the LR model.

The TGI may reflect a attention degree of target groups for a target in a particular research range (such as a geographical region, a population statistical field, media audience, product consumers). In this embodiment, a calculation method is: TGI=[a proportion of groups having a feature in the target groups/a proportion of groups having the same feature in the market users]*standard number. The standard number is 100.

For example, in the positive samples, in a group of persons aged 15 to 24, 8.9% of the persons have browsed a video website in the last year, but in the market users, a proportion of persons that have browsed the video website is 6.6%, and a TGI in the group of persons aged in 15 to 24 in the video website is 8.9%/6.6%*100=134.9. It indicates that the video website mainly locates the group of persons aged 15 to 24. A larger TGI value indicates higher fitness of the target group. The TGI represents a difference of problems concerned by users of different user features. If the TGI is equal to 100, it represents an average level, and if the TGI is higher than 100, it represents that a attention degree of the type of users on a type of problem is higher than a total level.

In this embodiment, TGI values of features are calculated first for a positive sample in a training set by using a TGI formula, and the TGI formula is:

$$TGI(i) = \frac{Rate_{seed}(i)}{Rate_{total}(i)} * 100$$

where TGI(i) represents a TGI value of a feature i, $Rate_{seed}(i)$ represents a proportion of users having the feature i in the seed group, and $Rate_{total}(i)$ represents a proportion of users having the feature i in the market users.

After the TGI values of the features are obtained, the features are sorted according to the TGI values. It may be known according to a property of the TGI that, a higher TGI value of the feature represents higher fitness of the feature with the target sample group. Therefore, several features having the highest TGI value are used as target features obtained by using the TGI values, and are referred to as a first target feature set herein.

For a node splitting IG in a decision tree, when a probability distribution of a random event needs to be predicted, the prediction should meet all known conditions, but does not make any subjective assumption for unknown cases. In this case, the probability distribution is most even, and a risk of the prediction is the smallest. In a machine learning process, a decision tree needs to be established, and a form of the decision tree is similar to a tree-form branch for determining statements. The problem is which attribute is most suitable for acting as a root node of the tree, there is no other nodes on the tree, and other attributes are all subsequent nodes. With the concept of the information theory, in this embodiment, a statistical magnitude "IG" is used to measure a capability of attributively distinguishing the foregoing data samples. If an IG amount is larger, the attribute, used as the root node of the tree, can make the tree simpler.

In this embodiment, IG values of the features are first calculated for the samples in the training set by using an IG formula, and the IG formula is:

$$IG(T, i) = \text{Entropy}(T) - \sum_{a \in Val(i)} p(x_i = a) \text{Entropy}(T \mid x_i = a) \text{Entropy}(x) - \bar{p}(x) \log(p(x))$$

where T represents a label in the training set, $p(x_i=a)$ represents a probability value of $x_i=a$, and $p(x)$ represents a probability value of x.

As described above, in a machine learning process, the form of the decision tree is similar to a tree-form branch for determining statements. For a sample feature, a larger obtained IG value indicates more tree-form branches of a decision tree corresponding to the feature, that is, more binary tree information can be reflected. Therefore, after the IG is obtained, several features having the highest IG value are used as the target features obtained by using the IG value, and are referred to as a second target feature set.

The LR (Logistic Regression) model is adding a logistic function on the basis of linear regression, to obtain a relationship between feature data and classification data. By constructing the LR model, weights of the features may be obtained. For example, for a feature $x_i$, its weight $h(x_i)>0.5$ represents that the feature has a positive sample inclination of a training sample, and $h(x_i)<0.5$ represents that the feature has a negative sample inclination of the training sample.

In this embodiment, the positive sample and the negative sample are first used to train the LR models, and then a series of features ranking top in the weights of the LR models are used as a third target feature set.

After at least two of the first target feature set, the second target feature set, and the third target feature set are re-sorted, a target feature set of the positive samples and the negative samples is obtained.

In an example, the first target feature set, the second target feature set, or the third target feature set may independently implement determining of the target feature set. In this case, for example, the first feature target set may be used as the target feature set.

Because the TGI is more inclined to represent the attention degree of users, the IG is inclined to simple selection of a binary tree, a training result of the LR model is more comprehensive, and different target feature set combinations may be selected according to different seed users and spreading targets for the seed users.

In an example, the first target feature set and the second target feature set are re-sorted. First, a first quantity of sample features included in the first target feature set and TGIs of the features are obtained. Then, a second quantity of sample features included in the second target feature set and IGs of the features are obtained. For each feature, a weighted sum (A*TGI+B*IG) of the TGI and the IG is calculated. The target feature sets are re-sorted based on the weighted sums, to obtain the re-sorted target feature sets, and a preset quantity of features are selected in descending order to be used as target sample features.

In an example, the first target feature set, the second target feature set, and the third target feature set are re-sorted. First, TGIs of the first quantity of sample features included in the first target feature set are obtained, IGs of the second quantity of sample features included in the second target feature set are obtained, and LRs of the third quantity of sample features included in the third target feature set are obtained. Then, for each feature, a weighted sum (A*TGI+B*IG+C*(LR−0.5)) of the TGI, the IG, and the LR is obtained. The target feature sets are re-sorted based on the weighted sums, to obtain the re-sorted target feature sets, and a preset quantity of features are selected in descending order to be used as target sample features.

Coefficients A, B, and C in the weighted sum may also be adjusted according to the features of the TGIs, the IGs, and the LR models and different seed users and different spreading targets of the seed users. For example, the positive users are selected to spread to users who cared about a type of service, and this type of user spreading pays more attention to the attention degree of the user. Therefore, because the TGIs are more inclined to represent the attention degree of the user, the weight of a weighted parameter A is increased appropriately. If the positive users are selected to spread subdivision of a type of service, the weight of a weighting coefficient of the IGs may be increased.

The re-sorting process is further accompanied by a process of excluding negative features. In an example, the positive features and the negative features obtained by training the LR models are sorted separately. For example, the target feature set includes a feature of being aged 30 to 40. If the feature is also included in the negative sample, the feature has no meaning for whether to spread the seed group. In this case, the feature needs to be excluded from the target feature set.

S250. Send the target sample feature set to a decision end, receive feedback information of the decision end, and determine, according to the feedback information, whether to spread the seed group.

After the target sample feature is determined, the quality of the seed group needs to be determined by using the target sample feature, to further determine whether to perform seed spreading. The step may be determined by a system user, or may be determined according to a preset condition. In the implementation environment shown in FIG. 1, the determining is completed in a decision server.

S260. Spread the seed group if it is determined to spread the seed group.

After the determining, if the seed group meets the condition, the seed group may be spread, and then, the step of spreading the seed group is performed. According to the obtained target sample feature, a group matching the seed group is found from the market users as a spreading group.

In the foregoing method embodiment, the TGI, the IG, and the LR model are used to obtain the target feature set, and effective evaluation for the quality of the seed group may be implemented based on the target feature set, to avoid spreading of a seed group with poor quality.

Figure 3:
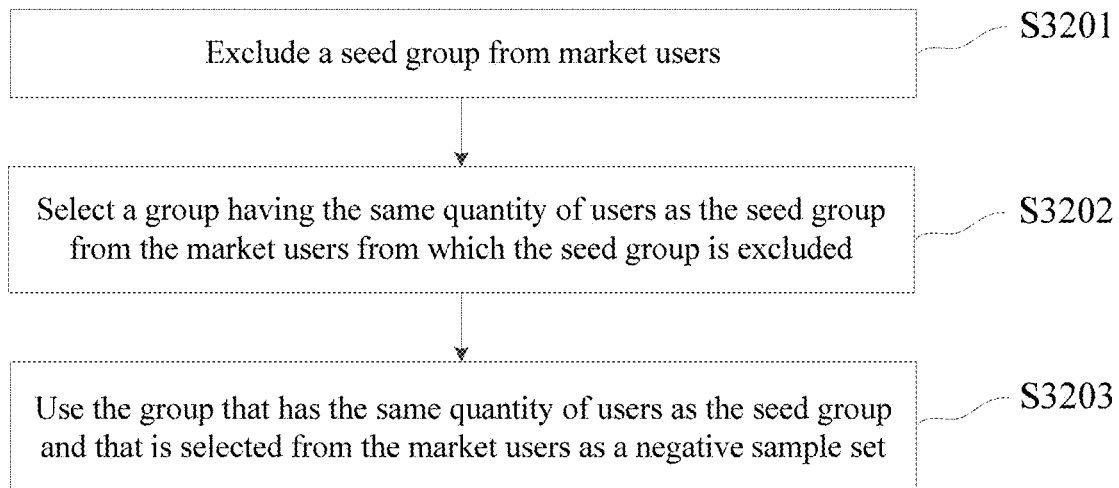
FIG. 3 is a schematic sub-flowchart of a seed group spreading method according to an embodiment of this application.

In another example, FIG. 3 is a seed group spreading method according to an embodiment of this application. The method may be applied to the implementation environment shown in FIG. 1. The method may include the following steps:

S310. Obtain, from candidate users of a database, a seed group and information corresponding to the seed group, and use the seed group as a positive sample set, the positive sample set including a plurality of positive samples, the seed group including a plurality of seed users, one seed user being corresponding to one positive sample, and the information corresponding to the seed group including a positive sample feature corresponding to each seed user.

In this embodiment of this application, the seed group is collected in a particular service scenario, and may be obtained by using information platforms or databases, and is stored in a preset database. In an example, the seed group is a group of persons having the same requirement on and the same interest in a product or service, and a quantity of seed groups is usually not large, and is generally below one hundred thousand. The seed group may be specifically collected from the preset database, where data of the database may be uploaded by information hosts of various types of information (such as advertisements), or may be obtained from corresponding transaction platforms.

Because the seed group is a group of persons having the same requirement on and the same interest in products and services, this type of group is used as a positive sample set.

S320. Obtain a non-seed group and information corresponding to the non-seed group, and use the non-seed group as a negative sample set, the negative sample set including a plurality of negative samples, the non-seed group including a plurality of non-seed users, one non-seed user being corresponding to one negative sample, and the information corresponding to the non-seed group including a negative sample feature corresponding to each non-seed user.

Using the seed group as the positive sample is to analyze the seed group. The seed group needs to be analyzed, and in an analyzing process, a negative sample set relative to the seed group may also need to be used.

It may be understood that, to find a user group similar to the seed group from market users, the problem is converted into a classic binary classification (0, 1) problem, that is, an output result only has two categories such as: (interested/uninterested), (like/dislike), (spam/ham), and (enemy/non-enemy).

As shown in FIG. 3, step S320 may further include the following substeps:

S3201. Exclude the seed group from market users.

Excluding the seed group from the market users is to avoid sample errors caused by repeatedly selecting the seed group into the non-seed group during selection of the non-seed group.

S3202. Select a group having the same quantity of users as the seed group from the market users from which the seed group is excluded.

Selecting the non-seed group having the same quantity of users as the seed group is for equal quantities of the positive samples and negative samples.

S3203. Use the group that has the same quantity of users as the seed group and that is selected from the market users as a negative sample set.

S330. Generate corresponding sample feature vectors for the positive samples and the negative samples.

An identifier of each positive sample in the positive sample set is combined with a corresponding positive sample feature to form a positive sample feature vector, and an identifier of each negative sample in the negative sample set is combined with a corresponding negative sample feature to form a negative sample feature vector.

Figure 4:
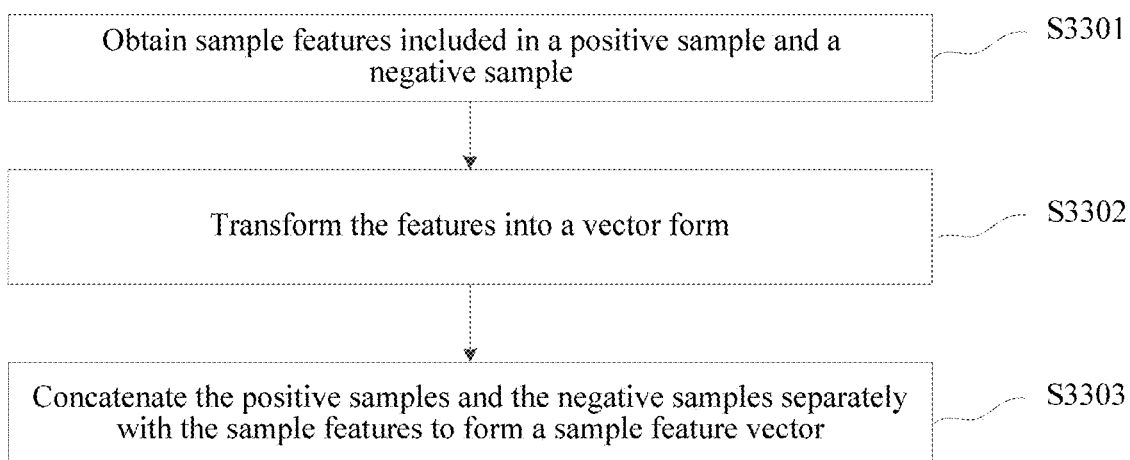
FIG. 4 is a schematic sub-flowchart of a seed group spreading method according to an embodiment of this application.

As shown in FIG. 4, step S330 may further include the following substeps:

S3301. Obtain sample features included in the positive sample and the negative sample.

As describe above, both the positive sample and the negative sample include a plurality of features. To analyze the positive and negative samples, features of the positive sample and the negative sample need to be first obtained.

S3302. Transform the features into a vector form.

After the plurality of sample features is obtained, to express the sample features, the sample features need to be transformed into an identifiable form. Therefore, the features may be transformed into an array or vector form.

S3303. Concatenate the positive samples and the negative samples separately with the sample features to form a sample feature vector.

The sample features of the positive samples are obtained, the sample features of the positive samples are transformed into a feature vector form, and the positive samples are matched and concatenated with the corresponding feature vectors, to form the sample feature vectors.

The sample features of the negative samples are obtained, the sample features of the negative samples are transformed into an feature vector form, and the negative samples are matched and concatenated with the corresponding feature vectors, to form the sample feature vectors.

After the sample concatenating step, the samples and the sample features are represented as the feature vector form.

S340. Obtain a target sample feature set from the positive sample feature vector and the negative sample feature vector according to at least two of a TGI, an IG, and an LR model.

The target feature set of the positive samples and the negative samples is obtained based on at least one of the TGI, the IG, and the LR model.

Figure 5:
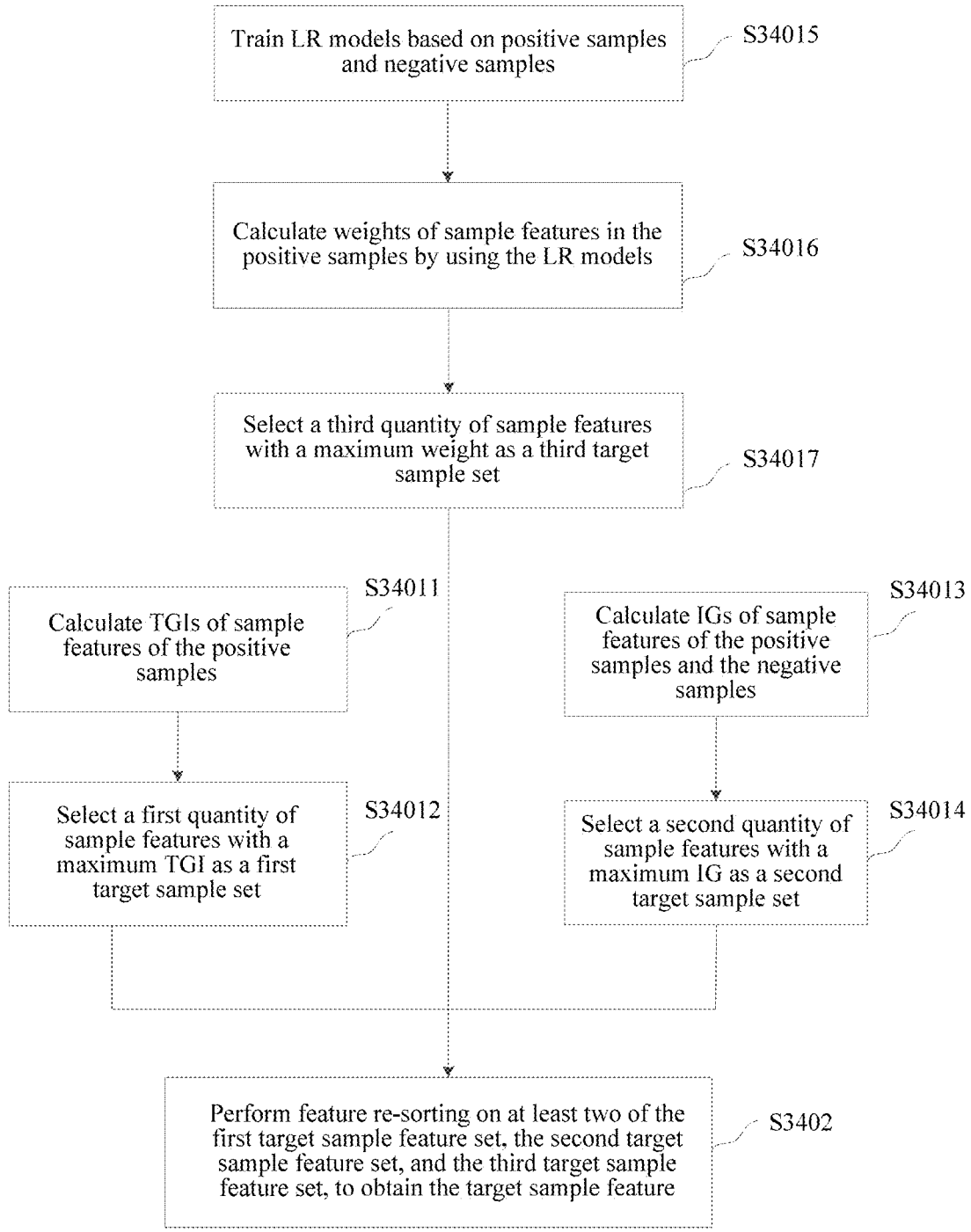
FIG. 5 is a schematic sub-flowchart of a seed group spreading method according to an embodiment of this application.

As shown in FIG. 5, step S340 may further include the following substeps:

S3401. Obtain a first target sample feature set obtained through calculation based on the TGI, a second target sample feature set obtained through calculation based on the IG, and a third target sample feature set obtained based on the LR model.

S3402. Perform feature re-sorting on at least two of the first target sample feature set, the second target sample feature set, and the third target sample feature set, to obtain the target sample feature set.

Step S3401 includes the step of calculating the first target sample feature set based on the TGI, and includes the following substeps:

S34011. Calculate TGIs of sample features of the positive samples.

S34012. Select a first quantity of sample features with a maximum TGI as the first target sample set.

Step S3401 includes the step of calculating the second target sample feature set based on the IG, and includes the following substeps:

S34013. Calculate IGs of sample features of the positive samples and the negative samples.

S34014. Select a second quantity of sample features with a maximum IG as the second target sample set.

Step S3401 includes the step of obtaining the third target sample feature set based on the LR model, and includes the following substeps:

S34015. Train LR models based on the positive samples and the negative samples.

S34016. Calculate weights of the sample features in the positive samples by using the LR models.

S34017. Select a third quantity of sample features with a maximum weight as the third target sample set.

S350. Send the target sample feature set to a decision end, receive feedback information of the decision end, and determine, according to the feedback information, whether to spread the seed group.

After the target sample feature is determined, the quality of the seed group needs to be determined by using the target sample feature, to further determine whether to perform seed spreading. The step may be determined by a system user, or may be determined according to a preset condition. In the implementation environment shown in FIG. 1, the determining is completed in a decision server.

After this step, if the feedback information represents that the seed group is not suitable for spreading, the server no longer performs other operations. As can be seen, in the foregoing method embodiment, the TGI, the IG, and the LR model are used to obtain the target feature set, and more effective and objective evaluation for the quality of the seed group may be implemented based on the target feature set, to avoid spreading of a seed group with poor quality.

Figure 6:
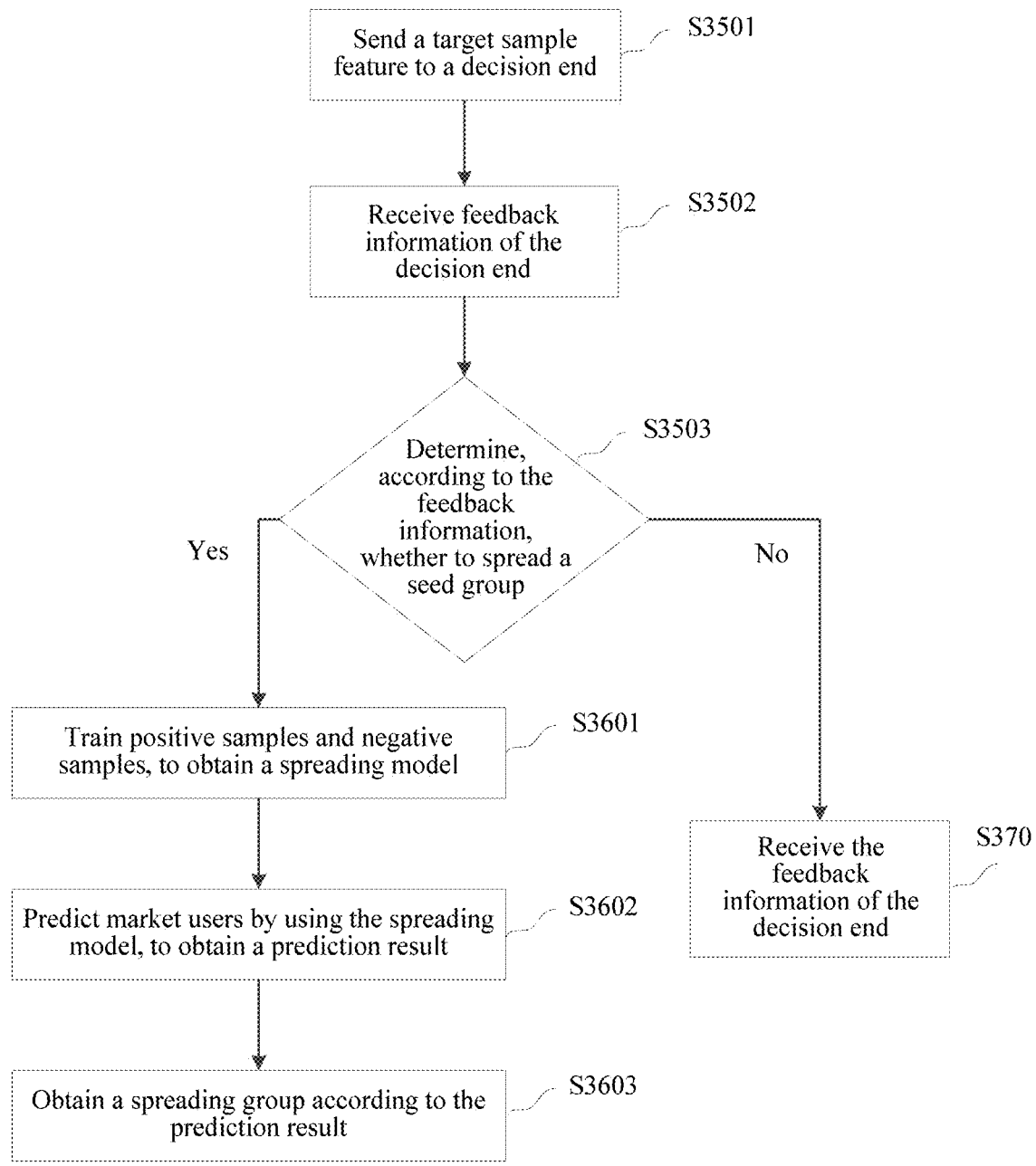
FIG. 6 is a schematic sub-flowchart of a seed group spreading method according to an embodiment of this application.

As shown in FIG. 6, the step may include the following substeps:

S3501. Send the target sample feature to a decision end.

The decision end may be determined manually, or a determining condition may be set. Through the manual determining or the preset condition, the quality of the seed group is determined by using the target sample feature, and feedback is performed according to the quality.

S3502. Receive feedback information of the decision end.

S3503. Determine, according to the feedback information, whether to spread the seed group.

After the feedback information of the decision end is received, the server may determine, according to the feedback information, whether to spread the seed group.

S360. Spread the seed group if it is determined to spread the seed group.

After the determining, if the seed group meets the condition, the seed group may be spread, and then, the step of spreading the seed group is performed. According to the obtained target sample feature, a group matching the seed group is found from the market users as a spreading group.

S370. Receive the feedback information of the decision end if it is determined not to spread the seed group.

As shown in FIG. 6, the step may include the following substeps:

S3601. Train the positive samples and the negative samples, to obtain a spreading model.

The spreading model may be an LR model, and the model may output a score according to an input sample.

In an example, the spreading model may be obtained through training according to a classic ADMMLR algorithm.

S3602. Predict the market users by using the spreading model, to obtain a prediction result.

The market users are predicted by using the spreading model, and the prediction result is a score related to an input user. For example, the prediction result may be a score or an estimation value for a click-through rate of a user for advertisement information.

S3603. Obtain a spreading group according to the prediction result.

After the score result is obtained, a score threshold is set, or a quantity of users having the highest score result are used as the spreading group. Then, the spreading group is output.

In the foregoing method embodiment, the TGI, the IG, and the LR model are used to obtain the target feature set, more effective and objective evaluation for the quality of the seed group may be implemented based on the target feature set, and the estimation result is obtained visually, to avoid spreading of a seed group with poor quality.

Figure 7:
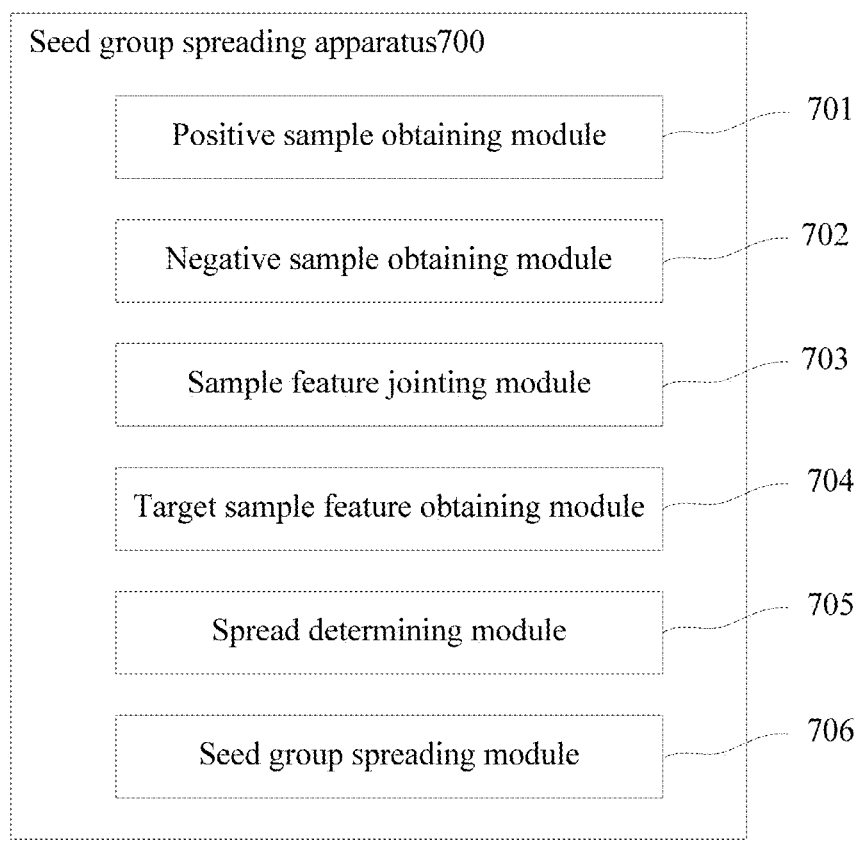
FIG. 7 is a principle block diagram of a seed group spreading apparatus according to an embodiment of this application.

FIG. 7 is a block diagram of a seed group spreading apparatus according to an embodiment of this application. The apparatus 700 has a function for implementing seed spreading in a backend server in the foregoing method embodiment. The function may be implemented by hardware or may be implemented by hardware executing corresponding software. The apparatus may include:

a positive sample obtaining module 701, performing step S210, and configured to obtain information about a seed group, and use the seed group as a positive sample;

a negative sample obtaining module 702, performing step S220, and configured to obtain information about a non-seed group, and use the non-seed group as a negative sample;

a sample feature jointing module 703, performing step S230, and configured to joint sample features for the positive sample and the negative sample;

a target sample feature obtaining module 704, performing step S240, and configured to obtain target sample features of the positive sample and the negative sample based on at least two of a TGI, an IG, and an LR model;

a spread determining module 705, performing step S250, and configured to, determine, according to the target sample features, whether to spread the seed group; and a seed group spreading module 706, performing step S260, and configured to spread the seed group.

Figure 8:
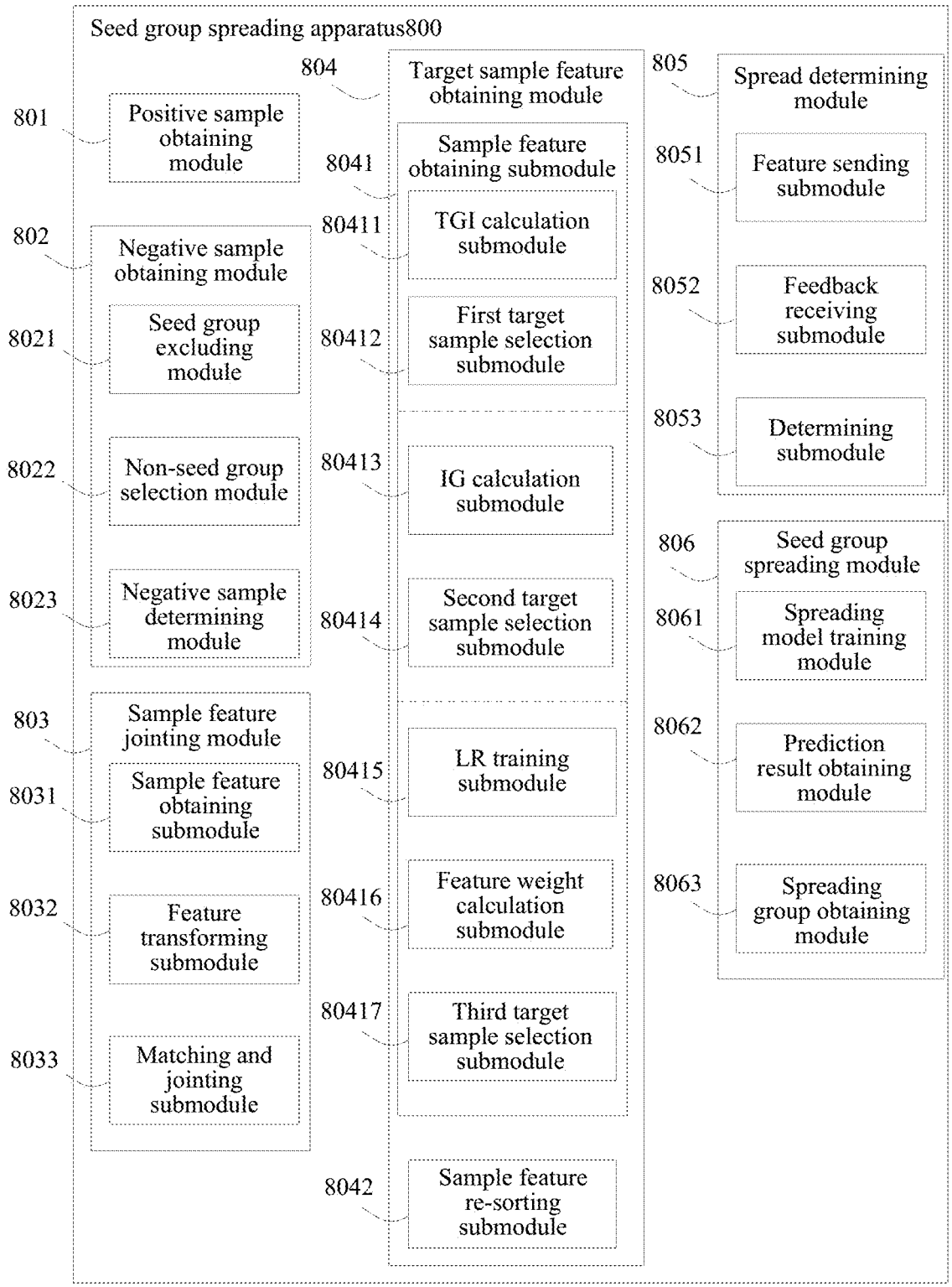
FIG. 8 is a principle block diagram of a seed group spreading apparatus according to an embodiment of this application.

FIG. 8 is a block diagram of a seed group spreading apparatus according to an embodiment of this application. The apparatus 800 has a function for implementing seed spreading in a backend server in the foregoing method embodiment. The function may be implemented by hardware or may be implemented by hardware executing corresponding software. The apparatus may include:

a positive sample obtaining module 801, performing step S310, and configured to obtain information about a seed group, and use the seed group as a positive sample.

a negative sample obtaining module 802, performing step S320, and configured to obtain information about a non-seed group, and use the non-seed group as a negative sample, the negative sample obtaining module 802 including the following submodules:

a seed group excluding module 8021, performing step S3201, and configured to exclude the seed group in market users;

a non-seed group selection module 8022, performing step S3202, and configured to select, from the market users in which the seed group is excluded, a group having the same quantity of users as the seed group as a non-seed group; and a negative sample determining module 8023, performing step S3203, and configured to use the group that has the same quantity of users as the seed group and that is selected from the market users, as a negative sample;

a sample feature jointing module 803, performing step S330, and configured to joint sample features for the positive sample and the negative sample, the sample feature jointing module 803 including the following submodules:

a sample feature obtaining submodule 8031, performing step S3301, and configured to obtain sample features included in the positive sample and the negative sample;

a feature transforming submodule 8032, performing step S3302, and configured to transform the features into an array or a vector form; and a matching and jointing submodule 8033, performing step S3303, and configured to match and joint each of the positive sample and the negative sample with the corresponding array or vector;

a target sample feature obtaining module 804, performing step S340, and configured to obtain target sample features of the positive sample and the negative sample based on at least two of the TGI, the IG, and the LR model, the target sample feature obtaining module 804 including the following submodules:

a sample feature obtaining submodule 8041, performing step S3401, and configured to obtain a first target sample feature set obtained through calculation based on the TGI, a second target sample feature set obtained through calculation based on the IG, and a third target sample feature set obtained based on the LR model, the sample feature obtaining submodule 8041 further including the following submodules:

a TGI calculation submodule 80411, performing step S34011, and configured to calculate TGIs of sample features of the positive samples;

a first target sample selection submodule 80412, performing step S34012, and configured to select a first quantity of sample features with a maximum TGI as the first target sample feature set;

an IG calculation submodule 80413, performing step S34013, and configured to calculating IGs of sample features of the positive samples and the negative samples;

a second target sample selection submodule 80414, performing step S34014, and configured to select a second quantity of sample features with a maximum IG as the second target sample feature set;

an LR model training submodule 80415, performing step S34015, and configured to train LR models based on the positive samples and the negative samples;

a feature weight calculation submodule 80416, performing step S34016, and configured to calculate weights of the sample features in the positive samples by using the LR models;

a third target sample selection submodule 80417, performing step S34017, and configured to select a third quantity of sample features with a maximum weight as the third target sample feature set; and a sample feature re-sorting submodule 8042, performing step S3402, and configured to perform feature re-sorting on at least two of the first target sample feature set, the second target sample feature set, and the third target sample feature set, to obtain the target sample feature set;

a spread determining module 805, performing step S350, and configured to determine, according to the target sample features, whether to spread the seed group, the spread determining module 805 including the following submodules:

a feature sending submodule 8051, performing step S3501, and configured to send the target sample feature to a decision end;

a feedback receiving submodule 8052, performing step S3502, and configured to receive feedback information of the decision end;

a determining submodule 8053, performing step S3503, and configured to determine, according to the feedback information, whether to spread the seed group; and a seed group spreading module 806, performing step S360, and configured to spread the seed group, the seed group spreading module 806 including the following submodules:

a spreading model training module 8061, performing step 3601, and configured to train the positive samples and the negative samples, to obtain a spreading model;

a prediction result obtaining module 8062, performing step S3602, and configured to predict the market users by using the spreading model, to obtain a prediction result; and a spreading group obtaining module 8063, performing step S3603, and configured to obtain a spreading group according to the prediction result.

Figure 9:
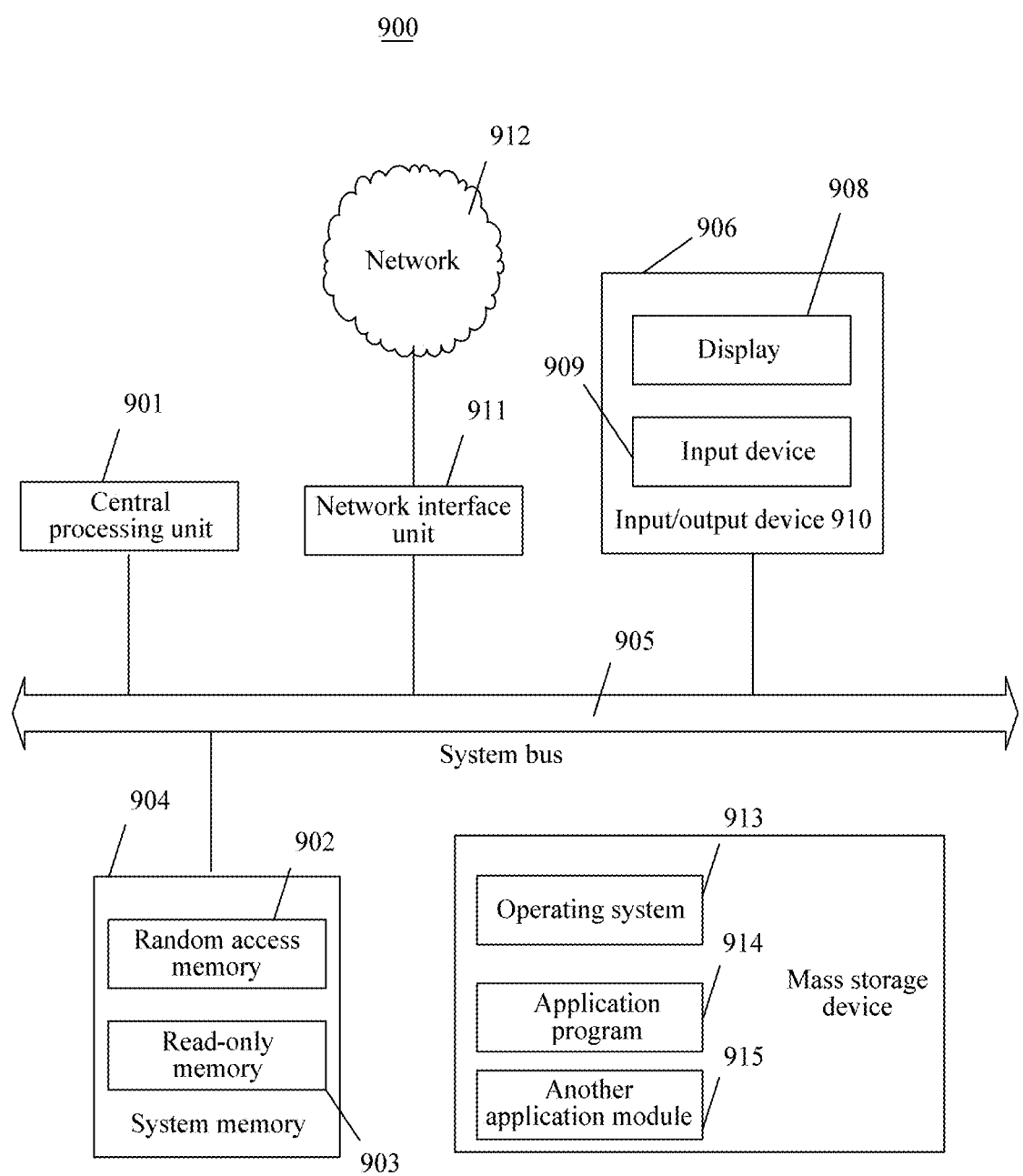
FIG. 9 is a schematic structural diagram of an implementation terminal according to an embodiment of this application.

FIG. 9 is a schematic structural diagram of a server according to an embodiment of this application. The server is configured to implement the seed group spreading method of the server side provided in the foregoing embodiment. Specifically:

The server 900 includes a central processing unit (CPU) 901, a system memory 904 including a random access memory (RAM) 902 and a read-only memory (ROM) 903, and a system bus 905 connecting the system memory 904 and the CPU 901. The server 900 further includes a basic input/output system (I/O system) 906 assisting in transmitting information between devices in a computer, and a mass storage device 907 configured to store an operating system 913, an application program 914, and another program module 915.

The basic I/O system 906 includes a display 908 configured to display information and an input device 909, such as a mouse or a keyboard, configured to input information for a user. The display 908 and the input device 909 are both connected to the CPU 901 by using an input/output controller 910 connected to the system bus 905. The basic I/O system 906 may further include the input/output controller 910, to receive and process inputs from a plurality of other devices, such as the keyboard, the mouse, or an electronic stylus. Similarly, the input and output controller 910 further provides an output to a display screen, a printer, or another type of output device.

The mass storage device 907 is connected to the CPU 901 by using a large-capacity storage controller (not shown) connected to the system bus 905. The mass storage device 907 and an associated computer readable medium provide non-volatile storage for the server 900. That is, the mass storage device 907 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD or other optical storages; and a cassette, a magnetic tape, a disk storage, or other magnetic storage devices. Certainly, a person skilled in the art may know that the computer storage medium is not limited to the foregoing types. The system memory 904 and the mass storage device 907 may be collectively referred to as a memory.

According to the embodiments of this application, the server 900 may further be connected, through a network such as the Internet, to a remote computer on the network. That is, the server 900 may be connected to a network 912 by using a network interface unit 911 connected to the system bus 905, or may be connected to another type of network or a remote computer system (not shown) by using a network interface unit 911.

The memory further includes one or more programs. The one or more programs are stored in the memory and configured to be executed by one or more processors. The one or more programs include an instruction used for performing the foregoing methods.

In an exemplary embodiment, a non-transitory computer readable storage medium including instructions, for example, a memory including instructions, is further provided. The foregoing instructions may be executed by a processor in a terminal to complete steps of a sender client or receiver client side in the foregoing method embodiments, or the foregoing instructions are executed by a processor in a server to complete steps of a backend server side in the foregoing method embodiments. For example, the non-transitory computer readable storage medium may be a ROM, a RAM, a CD-ROM, a magnetic tape, a floppy disk, or an optical data storage device.

It should be understood that "plurality of" mentioned in the specification means two or more. The "and/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this application are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium mentioned above may be a ROM, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A seed group spreading method using machine learning models performed at a computing device having one or more processors and memory storing a plurality of programs to be executed by the one or more processors, comprising:

obtaining, from candidate users of a database, a seed group and information corresponding to the seed group, and using the seed group as a positive sample set, the positive sample set comprising a plurality of positive samples, the seed group comprising a plurality of seed users, one seed user being corresponding to one positive sample, and the information corresponding to the seed group comprising a positive sample feature corresponding to each seed user;

obtaining a non-seed group and information corresponding to the non-seed group, and using the non-seed group as a negative sample set, the negative sample set comprising a plurality of negative samples, the non-seed group comprising a plurality of non-seed users, one non-seed user being corresponding to one negative sample, and the information corresponding to the non-seed group comprising a negative sample feature corresponding to each non-seed user;

obtaining a positive sample feature of the positive sample from the database, transforming the positive sample feature into a positive feature vector by a feature transforming submodule of the computing device, and matching and concatenating the positive sample with the corresponding positive feature vector, to form a positive sample feature vector;

obtaining a negative sample feature of the negative sample from the database, transforming the negative sample feature into a negative feature vector by the feature transforming submodule of the computing device, and matching and concatenating the negative sample with the corresponding negative feature vector, to form a negative sample feature vector;

obtaining a target sample feature set from the positive sample feature vector and the negative sample feature vector by calculating a weighted sum of sample feature values based on a target group index (TGI), an information gain (IG), and a logistic regression (LR) model according to $A*TGI+B*IG+C*(LR-0.5)$, wherein A, B, and C are coefficients in the weighted sum, and performing feature re-sorting on the weighted sum to obtain the target sample feature;

sending the target sample feature set to a machine learning spreading model trained from the target sample feature set, and feedback information of a decision end; and spreading the seed group by adding one or more candidate users to the seed group, the candidate users having one or more features similar to the seed group according to a prediction from the target sample feature set by the machine learning spreading model;

wherein the TGI represents a ratio of a proportion of users having a feature in the seed group, versus a proportion of users having the feature in the candidate users.

2. The method according to claim 1, where the obtaining the non-seed group and information corresponding to the non-seed group, and using the non-seed group as the negative sample set comprises:

excluding the seed group in the candidate users to obtain non-seed candidate users;

selecting a group having the same quantity of users as the seed group from the non-seed candidate users as a non-seed group; and using the non-seed group as a negative sample set.

3. The method according to claim 1, wherein the obtaining the target sample feature set from the positive sample feature vector and the negative sample feature vector according to the weighted sum of the sample feature values based on the TGI, the IG, and the LR model comprises:

obtaining a first target sample feature set obtained through calculation based on the TGI, a second target sample feature set obtained through calculation based on the IG, and a third target sample feature set obtained based on the LR model;

calculating the weighted sum of the sample feature values based on the TGI, the IG and the LR model for each feature of the first, the second and the third target sample feature set; and performing feature re-sorting on the first target sample feature set, the second target sample feature set, and the third target sample feature set, to obtain the target sample feature.

4. The method according to claim 3, wherein the obtaining the first target sample feature set obtained through calculation based on the TGI comprises:

calculating TGIs of sample features of the positive samples; and selecting a first quantity of sample features with a maximum TGI as the first target sample feature set.

5. The method according to claim 3, wherein the obtaining the second target sample feature set obtained through calculation based on the IG comprises:

calculating IGs of sample features of the positive samples and the negative samples; and selecting a second quantity of sample features with a maximum IG as the second target sample feature set.

6. The method according to claim 3, wherein the obtaining the third target sample feature set obtained based on the LR model comprises:

training LR models based on the positive samples and the negative samples;

calculating weights of the sample features in the positive samples by using the LR models; and selecting a third quantity of sample features with a maximum weight as the third target sample feature set.

7. The method according to claim 1, wherein the spreading the seed group comprises:

training the positive sample set and the negative sample set, to obtain a spreading model;

predicting the candidate users by using the spreading model, to obtain a prediction result; and obtaining a spreading group according to the prediction result.

8. A server comprising: one or more processors, memory, and a plurality of machine readable instructions stored in the memory, wherein the plurality of machine readable instructions, when executed by the one or more processors, cause the server to perform the following operations using machine learning models:

obtaining, from candidate users of a database, a seed group and information corresponding to the seed group, and using the seed group as a positive sample set, the positive sample set comprising a plurality of positive samples, the seed group comprising a plurality of seed users, one seed user being corresponding to one positive sample, and the information corresponding to the seed group comprising a positive sample feature corresponding to each seed user;

obtaining a non-seed group and information corresponding to the non-seed group, and using the non-seed group as a negative sample set, the negative sample set comprising a plurality of negative samples, the non-seed group comprising a plurality of non-seed users, one non-seed user being corresponding to one negative sample, and the information corresponding to the non-seed group comprising a negative sample feature corresponding to each non-seed user;

obtaining a positive sample feature of the positive sample from the database, transforming the positive sample feature into a positive feature vector by a feature transforming submodule of the computing device, and matching and concatenating the positive sample with the corresponding positive feature vector, to form a positive sample feature vector;

obtaining a negative sample feature of the negative sample from the database, transforming the negative sample feature into a negative feature vector by the feature transforming submodule of the computing device, and matching and concatenating the negative sample with the corresponding negative feature vector, to form a negative sample feature vector;

obtaining a target sample feature set from the positive sample feature vector and the negative sample feature vector by calculating a weighted sum of sample feature values based on a target group index (TGI), an information gain (IG), and a logistic regression (LR) model according to A*TGI+B*IG+C*(LR−0.5), wherein A, B, and C are coefficients in the weighted sum, and performing feature re-sorting on the weighted sum to obtain the target sample feature;

sending the target sample feature set to a machine learning spreading model trained from the target sample feature set, and feedback information of a decision end; and spreading the seed group by adding one or more candidate users to the seed group, the candidate users having one or more features similar to the seed group according to a prediction from the target sample feature set by the machine learning spreading model;

wherein the TGI represents a ratio of a proportion of users having a feature in the seed group, versus a proportion of users having the feature in the candidate users.

9. The server according to claim 8, where the obtaining the non-seed group and information corresponding to the non-seed group, and using the non-seed group as the negative sample set comprises:

excluding the seed group in the candidate users to obtain non-seed candidate users;

selecting a group having the same quantity of users as the seed group from the non-seed candidate users as a non-seed group; and using the non-seed group as a negative sample set.

10. The server according to claim 8, wherein the obtaining the target sample feature set from the positive sample feature vector and the negative sample feature vector according to the weighted sum of the sample feature values based on the TGI, the IG, and the LR model comprises:

obtaining a first target sample feature set obtained through calculation based on the TGI, a second target sample feature set obtained through calculation based on the IG, and a third target sample feature set obtained based on the LR model;

calculating the weighted sum of the sample feature values based on the TGI, the IG and the LR model for each feature of the first, the second and the third target sample feature set; and performing feature re-sorting on the first target sample feature set, the second target sample feature set, and the third target sample feature set, to obtain the target sample feature.

11. The server according to claim 10, wherein the obtaining the first target sample feature set obtained through calculation based on the TGI comprises:

calculating TGIs of sample features of the positive samples; and selecting a first quantity of sample features with a maximum TGI as the first target sample feature set.

12. The server according to claim 10, wherein the obtaining the second target sample feature set obtained through calculation based on the IG comprises:

calculating IGs of sample features of the positive samples and the negative samples; and selecting a second quantity of sample features with a maximum IG as the second target sample feature set.

13. The server according to claim 10, wherein the obtaining the third target sample feature set obtained based on the LR model comprises:

training LR models based on the positive samples and the negative samples;

calculating weights of the sample features in the positive samples by using the LR models; and selecting a third quantity of sample features with a maximum weight as the third target sample feature set.

14. The server according to claim 8, wherein the spreading the seed group comprises:

training the positive sample set and the negative sample set, to obtain a spreading model;

predicting the candidate users by using the spreading model, to obtain a prediction result; and obtaining a spreading group according to the prediction result.

15. A non-transitory computer readable storage medium storing a plurality of machine readable instructions in connection with a server having one or more processors, wherein the plurality of machine readable instructions, when executed by the one or more processors, cause the server to perform a plurality of operations using machine learning models including:

obtaining, from candidate users of a database, a seed group and information corresponding to the seed group, and using the seed group as a positive sample set, the positive sample set comprising a plurality of positive samples, the seed group comprising a plurality of seed users, one seed user being corresponding to one positive sample, and the information corresponding to the seed group comprising a positive sample feature corresponding to each seed user;

obtaining a non-seed group and information corresponding to the non-seed group, and using the non-seed group as a negative sample set, the negative sample set comprising a plurality of negative samples, the non-seed group comprising a plurality of non-seed users, one non-seed user being corresponding to one negative sample, and the information corresponding to the non-seed group comprising a negative sample feature corresponding to each non-seed user;

obtaining a positive sample feature of the positive sample from the database, transforming the positive sample feature into a positive feature vector by a feature transforming submodule of the computing device, and matching and concatenating the positive sample with the corresponding positive feature vector, to form a positive sample feature vector;

obtaining a negative sample feature of the negative sample from the database, transforming the negative sample feature into a negative feature vector by the feature transforming submodule of the computing device, and matching and concatenating the negative sample with the corresponding negative feature vector, to form a negative sample feature vector;

obtaining a target sample feature set from the positive sample feature vector and the negative sample feature vector by calculating a weighted sum of sample feature values based on a target group index (TGI), an information gain (IG), and a logistic regression (LR) model according to A*TGI+B*IG+C*(LR−0.5), wherein A, B, and C are coefficients in the weighted sum, and performing feature re-sorting on the weighted sum to obtain the target sample feature;

sending the target sample feature set to a machine learning spreading model trained from the target sample feature set, and feedback information of a decision end; and spreading the seed group by adding one or more candidate users to the seed group, the candidate users having one or more features similar to the seed group according to a prediction from the target sample feature set by the machine learning spreading model;

wherein the TGI represents a ratio of a proportion of users having a feature in the seed group, versus a proportion of users having the feature in the candidate users.

16. The non-transitory computer readable storage medium according to claim 15, where the obtaining the non-seed group and information corresponding to the non-seed group, and using the non-seed group as the negative sample set comprises:
excluding the seed group in the candidate users to obtain non-seed candidate users;
selecting a group having the same quantity of users as the seed group from the non-seed candidate users as a non-seed group; and
using the non-seed group as a negative sample set.

17. The non-transitory computer readable storage medium according to claim 15, wherein the obtaining the target sample feature set from the positive sample feature vector and the negative sample feature vector according to the weighted sum of the sample feature values based on the TGI, the IG, and the LR model comprises:
obtaining a first target sample feature set obtained through calculation based on the TGI, a second target sample feature set obtained through calculation based on the IG, and a third target sample feature set obtained based on the LR model;
calculating the weighted sum of the sample feature values based on the TGI, the IG and the LR model for each feature of the first, the second and the third target sample feature set; and
performing feature re-sorting on the first target sample feature set, the second target sample feature set, and the third target sample feature set, to obtain the target sample feature.

* * * * *